United States Patent

[11] 3,554,538

| [72] | Inventor | Fremont Fullmer<br>Salem Route, Rexburg, Idaho 83440 |
| --- | --- | --- |
| [21] | Appl. No. | 737,472 |
| [22] | Filed | June 17, 1968 |
| [45] | Patented | Jan. 12, 1971 |

[54] VEHICLE WITH FREELY ROTATING SAUCER
2 Claims, 7 Drawing Figs.

[52] U.S. Cl. .................................................. 272/29,
37; 104/59, 104/75; 180/9.24
[51] Int. Cl. ................................................... A63d 1/00
[50] Field of Search .......................................... 272/28, 29,
33, 34, 35, 37, 38, 39, 40, 43, 44, 46, 47, 48;
104/75, 59; 188/71, 77; 180/9.24

[56] References Cited
UNITED STATES PATENTS

| 909,500 | 1/1909 | Woerth | 104/75 |
| --- | --- | --- | --- |
| 1,448,764 | 3/1923 | Miller | 104/75 |
| 2,385,480 | 9/1945 | Webster | 180/9.24 |
| 2,660,264 | 11/1953 | Richardson | 188/77 |
| D.174,295 | 3/1955 | Sneed | 272/34 |
| 1,642,591 | 9/1927 | Morris | 272/29 |
| 3,408,068 | 10/1968 | Winton | 272/29X |

FOREIGN PATENTS

| 16,553 | 1/1882 | Germany | 272/29 |
| --- | --- | --- | --- |

*Primary Examiner*—Richard J. Johnson
*Attorney*—Lawrence J. Winter

ABSTRACT: An apparatus comprising a vehicle which is adapted to be propelled over irregular terrain and provided with a platform upon which is pivotally disposed a compartment or seat of saucerlike configuration and provided with roller support so that the seat is freely rotatable with respect to the pivotal connection upon which it is disposed. This therefore provides an unbalanced or eccentrically disposed weight or force freely rotatable about the pivotal connection when the seat is occupied by people. When the vehicle is moved over an uneven terrain, it will cause the people sitting on the seat to be thrown in an irregular or erratic movement back and forth so as to provide recreation and amusement for the parties occupying the seat. The vehicle also has a plurality of manual brake devices and hydraulic brake devices which are disposed in the rotatable saucer to stop its rotation as desired.

PATENTED JAN 12 1971 3,554,538

INVENTOR:
Fremont Fullmer

BY Lawrence J Venter
attorney

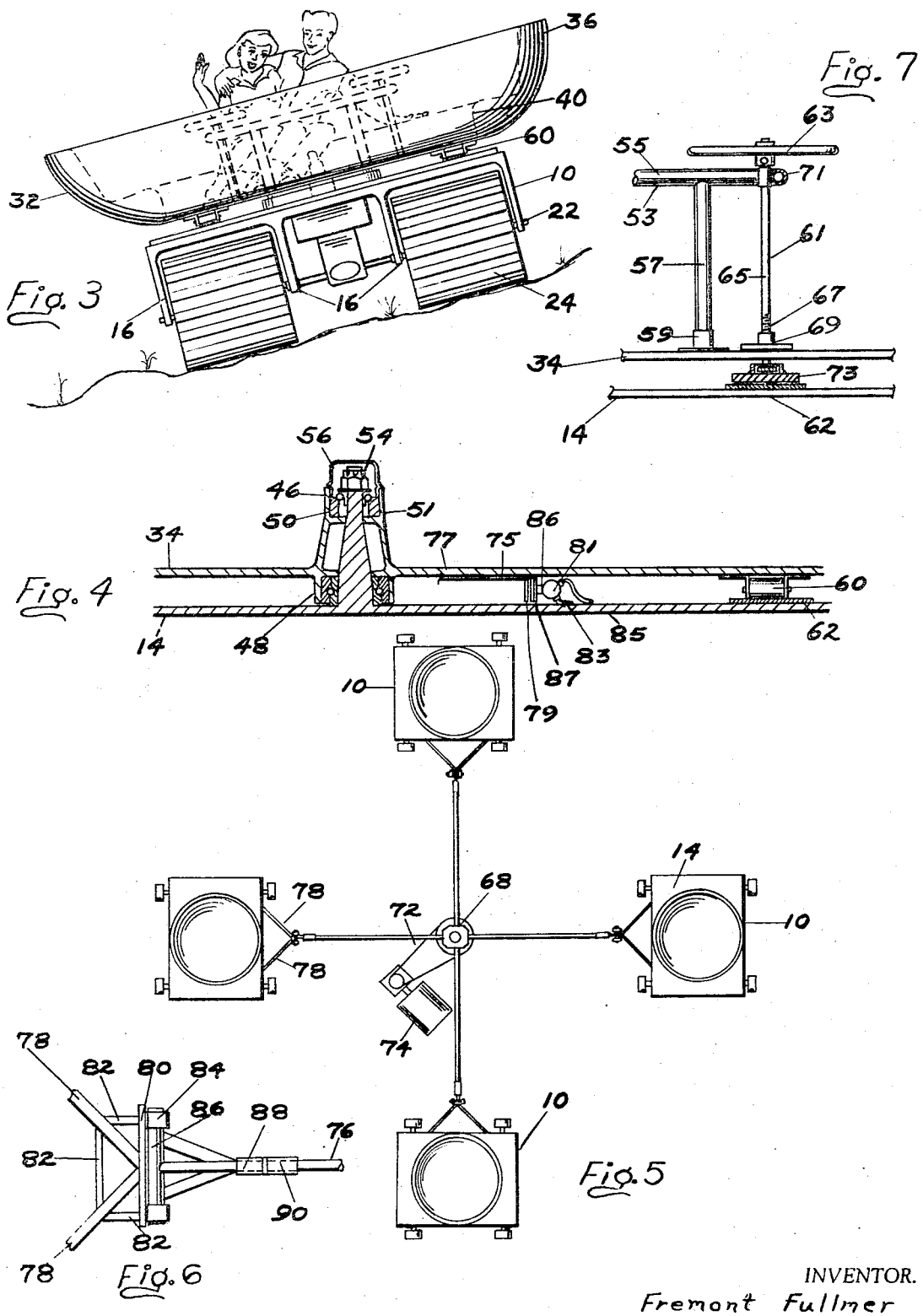

VEHICLE WITH FREELY ROTATING SAUCER

The present invention relates to an apparatus for the recreation and amusement of the occupants or riders and more particularly to an amusement vehicle that can be readily propelled over any terrain.

It is an object of the present invention to provide a vehicle that is provided with a freely rotating compartment or seat thereon which is occupied by persons riding it so as to provide them with recreation when the vehicle is driven or moved over uneven terrain such as uneven slopes, beaches, fields, and the like.

It is another object of the present invention to provide an amusement vehicle that is self-propelled and in which the vehicle is provided with track means for enabling the vehicle to move over unpaved fields and the like so as to provide an amusement device for people riding the vehicle.

It is another object of the present invention to provide a freely rotatable amusement vehicle compartment, which compartment is provided with a plurality of wheel means and rod means with braking shoe means on the bottom of the rod means for frictional engagement with platform means so as to prevent free rotation of the freely rotatable compartment or saucer when desired.

It is yet another object of the present invention to provide a manually operated braking shoe means within the riding compartment of the vehicle embodied in the present invention, so that the occupants of the compartment may readily apply the braking means in order to completely stop rotation of the freely rotatable compartment in order to prevent injury should the compartment be rotating too fast.

Yet another object of the present invention is to provide a vehicle with a freely rotating saucer disposed thereon with a plurality of manual braking devices disposed within easy reach of the individuals riding the vehicle so that they may quickly apply a braking force to stop the rotatable saucer or compartment from rotating as desired.

Another object of the present invention is to provide a vehicle having disposed thereon a freely rotatable saucer or compartment for carrying passengers therein, which freely rotatable compartment is provided with two separate braking systems, including a manual and a hydraulic braking device, which permits the freely rotatable compartment to be completely stopped as desired in order to prevent injury or excessive excitement or fear or panic among the passengers should the compartment rotate too quickly for the proper enjoyment of the amusement device by some of the passengers.

It is yet another object of the present invention to provide a vehicle with a freely rotating saucer means provided with seats and which saucer means is disposed upon roller means that ride upon a platform or track and which saucer means is further journaled upon a centrally located shaft means so as to permit the saucer means to be freely rotatable about said shaft means.

It is yet another object of the present invention to provide a self-propelled amusement vehicle provided with track means for enabling it to be driven over uneven terrain and which vehicle is provided with a platform upon which is disposed a freely rotatable saucer having seat means therein to seat persons thereon so that the weight of the persons occupying the seats will provide an uneven or unbalanced eccentric force causing the seats and the parties occupying them to be erratically rotated in one direction and then in the other direction by gravity as the vehicle is driven over uneven terrain so as to provide recreation for the parties carried by the vehicle.

Another object of the present invention is to provide a vehicle that travels over uneven and irregular terrain with a rotatable saucer means carried thereon for occupancy by fun seeking people as the vehicle moves over the uneven terrain so that the freely rotatable saucer will cause the occupants of the saucer to be rotated or moved in an erratic movement or rotation, first in one direction and then in another direction in a slow or quick fashion, which movement is caused by gravity and momentum in view of the fact that the occupants of the saucer will always be seated in a manner in which their combined weight will cause an unbalanced force about the central pivotal point of the saucer that they occupy.

It is yet another object of the present invention to provide a self-propelled vehicle that can be driven over uneven terrain and further is provided with a compartment for holding fun seeking persons which compartment is freely rotatable on top of the vehicle as it is driven over uneven terrain so that the weight of the people and the force of gravity will cause the people to be thrown back and forth and provide them with recreation.

It is yet another object of the present invention to provide a self-propelled vehicle with a freely rotating saucer disposed thereon, which saucer is freely rotatable with respect to the vehicle and so as to provide an amusement device that is of a portable nature and does not require any specific foundation or base upon which it can be used.

Another object of the present invention is to provide a vehicle with a platform thereon and a freely rotatable compartment disposed on a central member secured to said platform which is of simple and economical construction and can be readily manufactured.

It is yet another object of the present invention to provide a vehicle with a freely rotating saucer compartment thereon for the occupancy of parties, which vehicle can be readily combined with other vehicles and connected together so as to form an amusement vehicle that can be utilized by a large number of persons.

Various other objects and advantages of the present invention will be readily apparent from the following detailed description when considered in connection with the accompanying drawings forming a part thereof and in which:

FIG. 3 is a rear view of the vehicle illustrating the present invention;

FIG. 4 is a fragmentary enlarged detail view of the invention taken along the line 4—4 of FIG. 1;

FIG. 5 is a top plan view illustrating four vehicles of the present invention connected to each other so as to provide a plurality of vehicles combined together or connected together for occupancy by a large number of persons;

FIG. 6 is an enlarged fragmentary detail view of the means embodied in the present invention for connecting the single vehicles together to form a combined device; and FIG. 7 is an enlarged detail view, taken along line 7—7 of FIG. 1, of the manual and hydraulic braking devices of the present invention.

Figure 1:
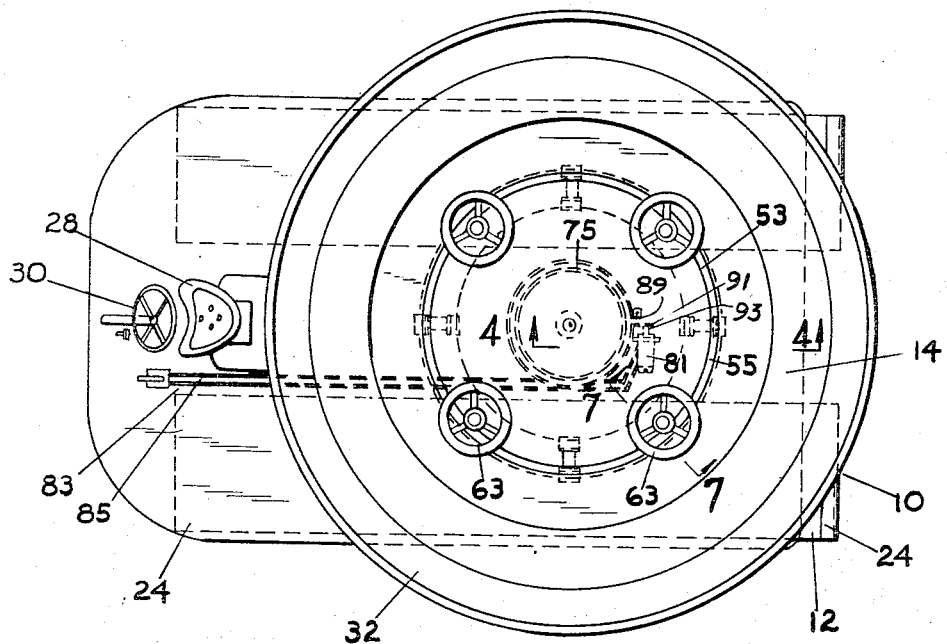
FIG. 1 illustrates a top plan view of the vehicle embodying the present invention.

Referring to the drawings, the reference numeral 10 generally designates the vehicle of the present invention, which comprises a frame 12 provided with a substantially horizontal platform 14. The platform 14 is provided with vertically depending legs 16 adjacent its front end 18 and its rear end 20. It will also be noted that the legs 16 extend downwardly from the front and rear ends and centrally of the platform 14 as best seen in FIG. 3. The inner and outer legs 16, as seen in FIG. 3, provide struts for receiving the axles of the vehicle.

Figure 2:
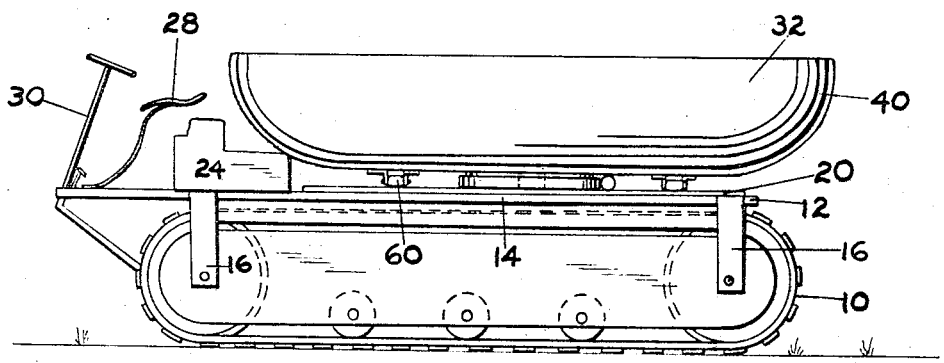
FIG. 2 is a side view of the vehicle embodying the present invention.

The vehicle shown in FIGS. 1 to 3 is provided with an endless track 24 on opposite sides thereof, which tracks 24 are supported by any well known means and secured in a well known manner to the axles 22 so as to be driven or moved by a propulsion engine 26. The engine 26 can be an internal combustion engine or a diesel engine or an electric motor if desired, and is operatively connected so as to rotate the drive axle in order to propel the track 24 to move the vehicle over the ground.

Referring to FIG. 2, the front end 18 of the platform 14 is provided with a seat 28 for the operator or driver and is also provided with a steering column 30 that is suitably connected by any well known means to the vehicle in order to properly steer it to the left or the right as desired.

A cylindrical compartment or saucer 32 is provided adjacent the rear of the platform. The saucer 32 comprises a substantially horizontal bottom 34 with upwardly extending arcuate walls 36 forming a continuous wall around the circular platform or bottom 34 of the saucer. The saucer 32 is provided with an annular seat 40 therein for occupancy by persons desiring to ride the vehicle as illustrated in FIG. 3.

Adjacent the rear central portion of the platform 14 is a vertical stub shaft 42 extending upwardly therefrom. This stub shaft or center post is adapted to provide a central member about which the saucer 32 is freely rotatable. Referring to FIG. 4, the center of the bottom 34 of the saucer 32 is provided with a vertically extending hub or boss 44. The hub 44 is provided with an upper sleeve portion 46 and a lower sleeve portion 48 extending below the bottom 34. A ball bearing member 50 is disposed on an annular rim 51 adjacent the upper sleeve 46 while another ball bearing member 52 is disposed on the platform 14 adjacent the lower sleeve 48 so as to provide nonfriction bearing means for permitting free rotation of the saucer 32 about the vertical center post or axle 42 of the vehicle platform. The upper end of the axle 42 has threaded thereon a nut 54 over which is disposed a cap 56.

The circumferential portion of the bottom 34 is provided with a plurality of circumferentially spaced lugs or ears 58 secured thereto by any suitable means and carrying roller bearings 60 which ride on a circular track or plate 62 secured by any suitable means to the horizontal platform 14 of the vehicle.

Referring to FIG. 7, the bottom 34 of the riding saucer 32 is provided with a hand rail 53. The hand rail 53 is disposed in front of the circular or annular seat 40 and comprises a circular, substantially horizontal railing 55 secured to the top of a plurality of circumferentially spaced vertical members or posts 57 having their lower ends secured in tubular collars 59, which tubular collars in turn are secured to the bottom 34 of the saucer.

The saucer is further provided with manual braking means generally indicated as 61 for operation and actuation by the passengers in the saucers. The manual braking means is provided with a plurality of individual hand wheels 63 disposed on vertical shafts or rods 65 around the interior of the circular railing 55, as best seen in FIG. 1. The lower ends of the vertical shafts 65 are externally threaded as indicated at 67 and the external threads are adapted to engage in complementary internal threads in a collar member 69 which is secured by welding or similar means to the top of the bottom 34 of the saucer.

The upper ends of the shafts 65 extend through a sleeve bearing 71 which is secured to the inner surface of the circular railing 55. The individual hand wheels 63 are fixed to rotate the shafts 65 so as to thread the vertical shafts or rods 65 upwardly and downwardly in the individual collars 69. The lower end of each of the shafts 65 is provided with a circular brake shoe or brake disc 73, adapted to engage the upper surface of the circular track 62 when the brake is applied thereto. Thus, it can be readily seen that the description of the manual braking means 61 provides a means for braking the freely rotatable saucer by the individual passengers riding the saucer.

With respect to the hydraulic braking means of the present invention, the hydraulic braking system is best seen in FIGS. 1 and 4. Secured to the bottom 34 of the saucer is an annular braking drum 75 provided with a substantially horizontal leg 77 and a vertical leg 79 depending downwardly therefrom. Extending around drum leg 79 is a flexible circumferential brake shoe belt or band 87 which is split adjacent flanges 89 and 91. Flange 89 is secured to the platform 14 by any suitable means while flange 91 is secured to the piston rod 93 of a hydraulic cylinder 81.

The hydraulic cylinder 81 is secured to platform 14 also and has hydraulic lines 83 and 85 extending to the front of the vehicle for control by the operator riding on the seat 28 of the vehicle. The hydraulic lines control the flow of fluid to the opposite ends of the hydraulic cylinder so as to tighten the braking belt 87 by moving flange 91 toward flange 89 to stop movement or rotation of the saucer.

In operation, a driver occupies the seat 28 of the vehicle and steers the vehicle across any predetermined terrain, especially uneven terrain, so that the weight of the parties occupying the vehicle, as clearly shown in FIG. 3, will cause an eccentric or unbalanced weight about the center post 42. Since the saucer 32 is freely rotatable about the center post as it is disposed on the ball bearings in the upper and lower sleeves, and since the bottom 34 of the saucer is further provided with the circumferentially disposed roller bearings, the movement of the vehicle over the uneven terrain or the slope will cause an uneven and erratic movement or rotation of the saucer, first in one direction and then in the other direction, so that the abrupt movement will in effect cause the parties to be tossed or thrown about as if they were on an amusement vehicle. The driver of the vehicle can also quickly speed up or slow down the vehicle so that this will also cause the erratic movement to be speeded up and slowed down to give more momentum to the movement of the saucer about the center post.

When the saucer 32 is rotating too fast for the individual passengers riding in the saucer, the passengers may slow down or completely stop the rotation of the saucer by grasping the hand wheel 63 and turning shaft 65 in a direction in order to thread the lower end of the shaft 65 downwardly in the collar 69 until the brake shoe 73 contacts the track 62 so that the frictional engagement of the brake shoe, which is made of any well known brake lining material, will cause the saucer to lose speed and slow down or completely stop if desired. When it is desired to again let the saucer freely rotate, the passenger merely rotates the hand wheel 63 in the opposite direction so as to raise the shaft 65 and disengage the brake shoe 73 from contact with the circular track 62 and the saucer is again freely rotatable.

Should the saucer be rotating too quickly and such condition is observed by the driver of the vehicle disposed on the seat 28, he can control the supply of hydraulic fluid through the lines 83 and 85 so as to move the piston rod 93 and flange 91 toward the flange 89 in order to tighten the brake belt 79 around the outer periphery of drum leg 79 to cause the frictional force to stop the rotation of the saucer. When the saucer has slowed down sufficiently, the vehicle operator may release the braking mechanism so that the band will loosen and flange 91 will move away from flange 89 and become disengaged from drum leg 79 and the saucer may thereafter freely rotate.

Referring to the embodiment of the invention shown in FIG. 5, a plurality of the vehicles have been connected together about a central frame 68. The frame 68 is provided with a pulley 70 disposed on and fixed to a vertical axle and driven by a belt 72 operatively connected to a motor 74. The vertical axle to which the pulley 70 is fixed for rotation of the axle is further provided with horizontally extending arms or rod members 76 operatively connected to the axle so as to be moved or rotated in a circular direction thereabout. The platform 14 of the vehicle is provided adjacent its inner side with two V-configuration braces or struts 78 extending from the side of the platform 14 and having their outer ends connected to a plate 80, as best seen in FIG. 6. These struts 78 may be detachably connected to the side of the platform 14 by any suitable well known means. The plate 80 and the outer or the converging ends of the struts 78 away from the platform 14 are provided with a plurality of subbrace members 82 rigidly securing them together. The plate 80 is further provided with spaced trunnions 84 in which is journaled a T-shaped rod member 86' having its end 88 threadably connected to a sleeve 90 on the outer end of the arm 76. For purposes of illustration, it will be noted that in this embodiment of the invention, instead of using the endless tracks as described in connection with the embodiment of the invention shown in FIGS. 1 to 3, the platforms are provided with wheels. The operation of the motor 74 causes the vertical axis to rotate and moves or drives the individual vehicles in a circle about the pulley 70. Since the vehicles are disposed on uneven ground or terrain, the T-shaped member 86 and the trunnions 84 permit the vehicles to have a slight upwardly and downwardly movement with sidewise tipping of the vehicle which causes a pivoting movement or motion of the vehicle with respect to the arms 76. If desired, the inner end of the arms 76 may also be suitably provided with a similar cross-trunnion and bearing to permit greater vertical movement of the vehicle at the end of the long rigid arms 76.

Thus the present invention provides a vehicle that can be self-propelled and can carry a freely rotatable saucer or compartment thereon for occupancy by persons desiring to ride the vehicle so that the eccentric and unbalanced weight of the parties occupying the seat of the saucer or compartment will cause erratic movement or an oscillating movement of the saucer and its occupants as the vehicle is driven or moved over uneven terrain.

Thus the present invention provides a self-propelled and portable amusement vehicle for movement across fields, along the side of a hill, or over beaches and the like, and requires no rigid or fixed platform such as is used today in amusement vehicles.

From the foregoing description it is apparent that the present invention further provides a freely rotatable saucer that has independent manual and hydraulic braking systems to enable either the passenger or the vehicle operator to slow down rotation of the saucer in order to avoid over excitement or injury to any of the passengers riding the vehicle.

Inasmuch as various changes may be made in the location and arrangement of the relative parts without departing from the scope of the invention, it is to be understood that the invention is not to be limited to the above description, except by the scope of the following claims.

I claim:

1. A vehicle with endless track means thereon and a propulsion unit for transporting said vehicle over a surface, a platform on said vehicle for supporting a rider compartment thereon, a vertical axis on said platform, a passenger compartment having a substantially horizontal bottom with an upwardly extending arcuate wall therearound and an annular seat on the inner surface of said wall, bearing and hub means freely rotatably supporting said platform on said axis, and brake means for said compartment including a brake shoe disposed to engage said platform, actuating means for moving said shoe in one direction toward said platform and in another direction away from said platform, and other braking means are provided including a brake band disposed to frictionally engage a brake drum on said compartment and hydraulic actuating means for operating said brake band, said brake drum having a downwardly extending circumferential leg and said brake band comprising a split flexible belt circumventing said leg.

2. The vehicle of claim 1 wherein handrail means are provided in said compartment.